United States Patent [19]

Lewis

[11] Patent Number: 5,681,142
[45] Date of Patent: Oct. 28, 1997

[54] DAMPING MEANS FOR A STATOR ASSEMBLY OF A GAS TURBINE ENGINE

[75] Inventor: David A. Lewis, Andrews, N.C.

[73] Assignee: United Technologies Corporation, Hartford, Conn.

[21] Appl. No.: 169,792

[22] Filed: Dec. 20, 1993

[51] Int. Cl.⁶ .............................. F01D 9/04; F01D 25/04
[52] U.S. Cl. ........................................ 415/119; 415/209.3
[58] Field of Search ............................. 415/208.1, 209.3, 415/119; 416/500

[56] References Cited

U.S. PATENT DOCUMENTS

| | | | |
|---|---|---|---|
| 4,516,910 | 5/1985 | Bouiller et al. | 416/500 |
| 4,621,976 | 11/1986 | Marshall et al. | 415/119 |
| 4,721,434 | 1/1988 | Marshall et al. | 415/119 |
| 4,728,255 | 3/1988 | Kirkpatrick et al. | 415/119 |
| 5,215,432 | 6/1993 | Pickering et al. | 415/119 |

FOREIGN PATENT DOCUMENTS

| | | | |
|---|---|---|---|
| 0807231 | 1/1959 | United Kingdom | 415/209.3 |
| 2037902 | 7/1980 | United Kingdom | 415/119 |

*Primary Examiner*—Christopher Verdier
*Attorney, Agent, or Firm*—Norman Friedland

[57] ABSTRACT

The clocking modes incidental to the vibrations encountered in the stator assembly in the compressor section of a gas turbine engine are damped by a spring damper formed as a split ring or a ring of equally shaped and sized segments having a pair of working surfaces. The spring damper is generally U-shaped in cross section and is fixed at the apex with one of the working surfaces in frictional engagement with the base of the vanes and the other working surface in frictional engagement with the containment ring attached to the diaphragm of the stator vane for supporting the inner diameter of the vanes.

8 Claims, 4 Drawing Sheets

DAMPING MEANS FOR A STATOR ASSEMBLY OF A GAS TURBINE ENGINE

This invention was made under a U.S. Government contract and the Government has rights herein.

TECHNICAL FIELD

This invention relates to means for damping the stator assembly of a gas turbine engine and particularly to dampen the clocking mode that the assembly encounters.

BACKGROUND ART

As one skilled in this art will appreciate, it is typical in gas turbine engines powering aircraft to dampen individual components to prevent them from getting into resonance or to otherwise adversely impact its structural integrity due to the vibratory envirornnent in which they must operate. Hence, in a compressor stator assembly it is usual to dampen the airfoil separately from the shrouds or dampen the shroud separately from the airfoil or damping one without damping the other.

It has been found that compressor stators of the gas turbine engine typically encounter a class of vibratory modes known in the art as "clocking modes". In this dynamic phenomenon, cyclic axial motion imparted to the stator inner diaphragm as the air flows between and over the circumferentially spaced airfoils causes the vanes to unwrap some of their aerodynamic twist. The unwrapping of the vanes imparts rotation to the moving inner diaphragm. The resulting modal motion is cyclic axial displacement of the vane inner diameter relative to the fixed outer diameter, and rotational oscillation of the inner diameter vane containment ring and diaphragm relative to the fixed outer shroud.

I have found that I can dampen the specific modal characteristics i.e. the clocking mode, in a stator assembly for a compressor for a gas turbine engine by utilizing a spring damper that is judiciously attached to the inner diaphragm as will be described in more detail hereinbelow.

As the stator inner diaphragm moves fore and aft the spring loaded damper rubs at its contact points. The friction damping removes energy from the vibrating system. The level of damping is dependant on the relative motion between the damper's fixity point and the contact points. It has been shown that there is relative motion for pivoting about the outer shroud.

Additionally, there is similar relative motion for the rotational component, as the fixity point has a different tangential motion than the motion at the contact point.

As one skilled in this art will recognize the product of the relative motion and the friction force opposing motion is a measure of the energyremoved from the system. The inventive damper serves to dissipate this energyto enhance the life of the components and prevent the stator assembly from getting into resonance.

SUMMARY OF THE INVENTION

An object of this invention is to provide an improved damper for a stator assembly for a gas turbine engine. In particular, in the preferred embodiment the stator assembly is a part of the compressor section.

A feature of this invention is to judiciously attach a spring damper that includes working surfaces in contact with the underside of the stator vanes and the front face of the inner vane containment ring.

A feature of this invention is to provide an improved damper for a stator assembly that is simple to fabricate and assemble, light in weight and inexpensive.

The foregoing and other features of the present invention will become more apparent from the following description and accompanying drawings.

BEST MODE FOR CARRYING OUT THE INVENTION

While the invention is disclosed in its preferred embodiment as being incorporated in the stator assembly for a compressor of a gas turbine engine, as one skilled in this art will appreciate the invention can be utilized with any assembly that has the problem of dealing with the "clocking mode" vibration phenomenon. As for an example, the same or similar problem may be evidenced in the stator assembly for the turbine section of the gas turbine engine. Additionally, engines other than gas turbine engines may encounter similar problems.

Figure 1:
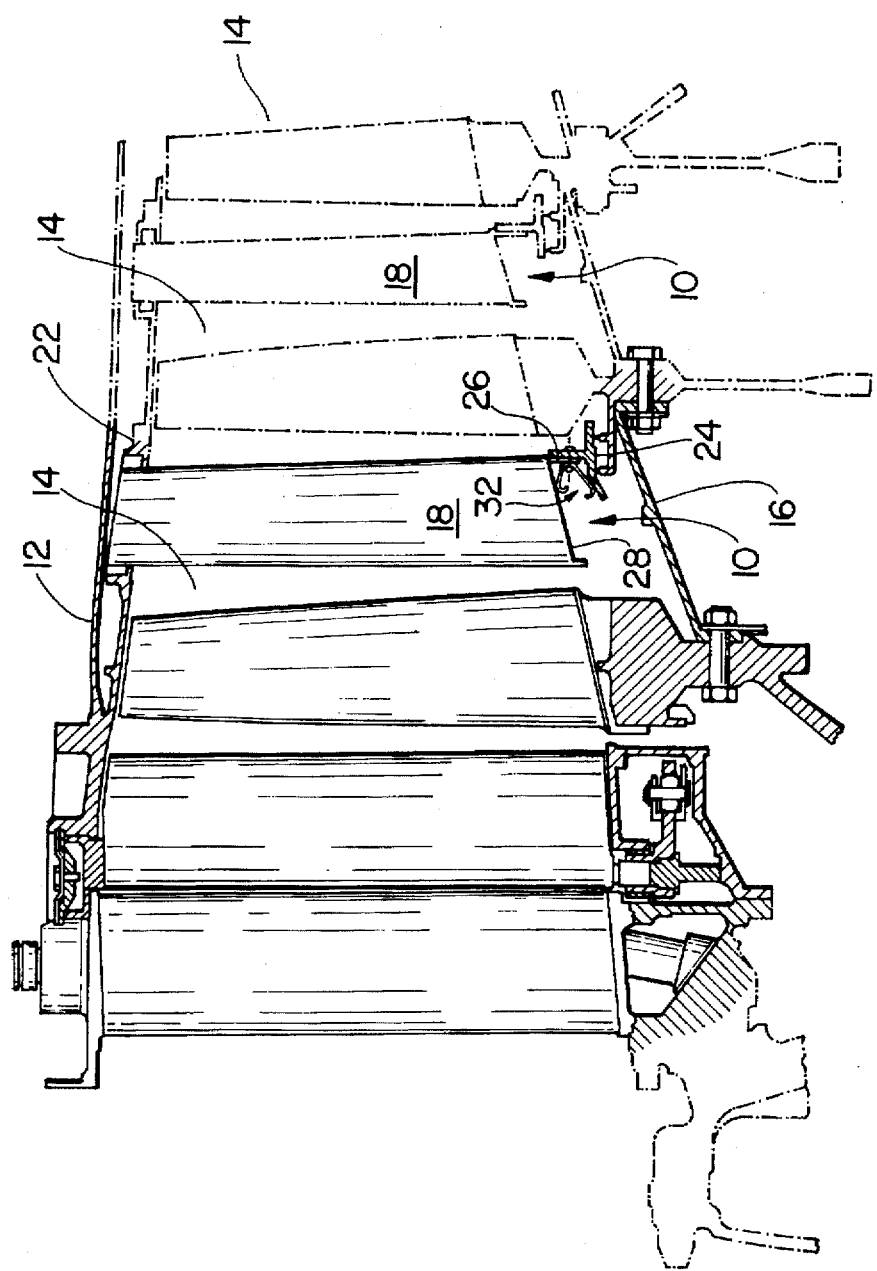
FIG. 1 is a partial view partly in section and partly in phantom illustrating the compressor section of a gas turbine engine incorporating this invention.
Figure 3:
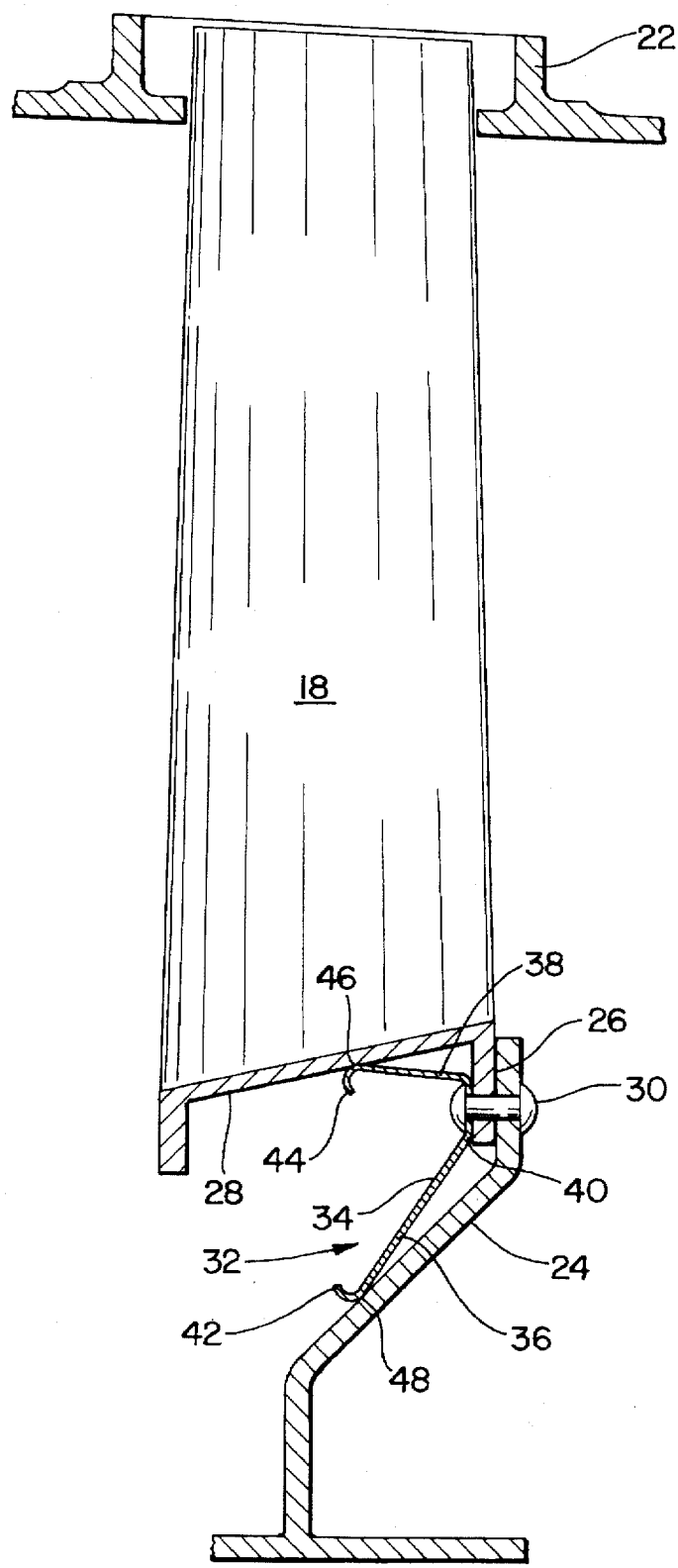
FIG. 3 is a partial view in section showing the details of this invention.

FIGS. 1 and 3 which best illustrate this invention as consisting of a stator assembly generally illustrated by reference numeral 10 for an axial flow compressor comprised of a number of compressor stages. Obviously, this is only a partial view and the other stages mounted in the compressor case 12 are not shown. Each stator assembly 10 is mounted ahead of the compressor rotors 14, which, in turn, is attached to the main engine shaft 16 and is rotated thereby. For the sake of convenience and simplicity, only one stator assembly is being described but as one skilled in the art will recognize the invention can be applied to a number of stator assemblies as the need requires.

The stator assembly consists of a plurality of equally and circumferentially spaced airfoils or vanes 18 that serve to direct the engine working mediumto the rotating rotor blades at an optimum angle of attack to attain optimum compressor efficiency. The stator assembly may be made in segments, in this instance. four segments identified by reference numeral 20 are mounted end to end to form an annular ring defining an annular passage for the gas path. An annular outer shroud 22 and inner diameter vane containment ring 24 concentrically spaced relative to the outer shroud 22 and coaxially mounted around the engine's center line A and diaphragm 26 extending radially inwardly from the base or inner shroud 28 of vane 18 toward the engine shaft form the remaining portion of the vane assembly. The diaphragm 26 is attached to the inner diameter containment ring 24 by any suitable means such as rivet 30.

In accordance with this invention the spring damper 32 is essentially formed either as a split ring or a segmented ring and is fabricated from a suitable spring metallic material that is flexible and highly resilient and is configured into a generally U-shaped member 34 comprising a pair of arms 36 and 38 and a generally flat base portion 40 in the form of an apex. The outer edges 42 and 44 of the arms 36 and 38, respectively, may be rounded as shown. The spring damper is attached to the diaphragm by rivet 30 through an aperture that complements the apertures formed in the diaphragm 26 and inner diameter containment ring 24.

Figure 2:
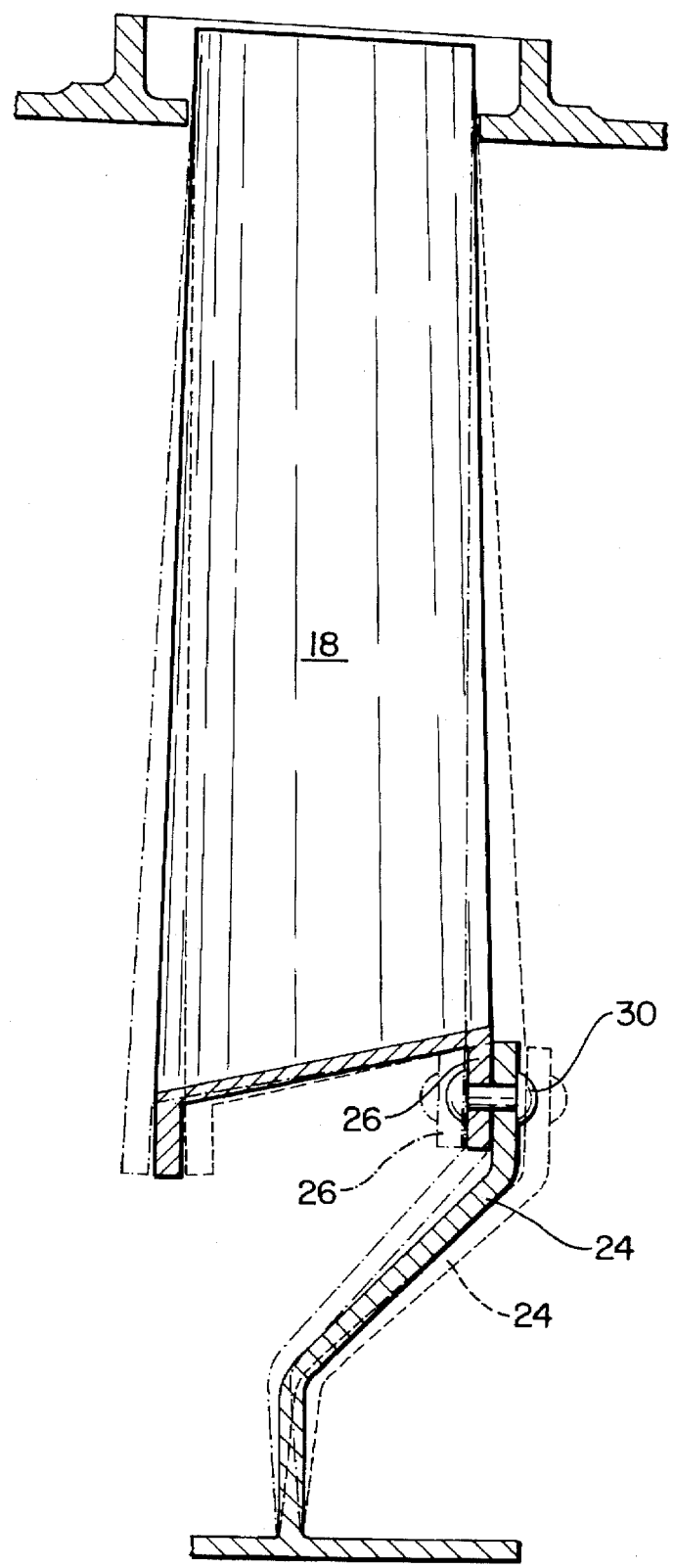
FIG. 2 is a partial view in section illustrating the prior art stator vane assembly and the vibration modes encountered.
Figure 2A:
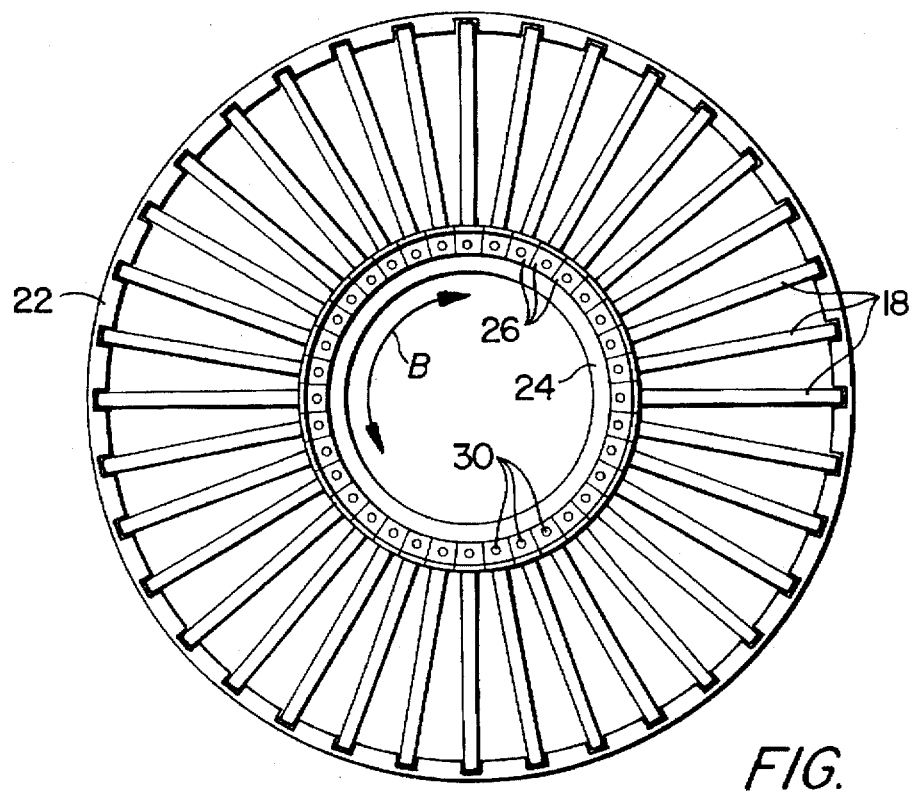
FIG. 2A is a schematic view of the prior art stator vane assembly showing another vibratory mode the static vane assembly encounters.
Figure 4:
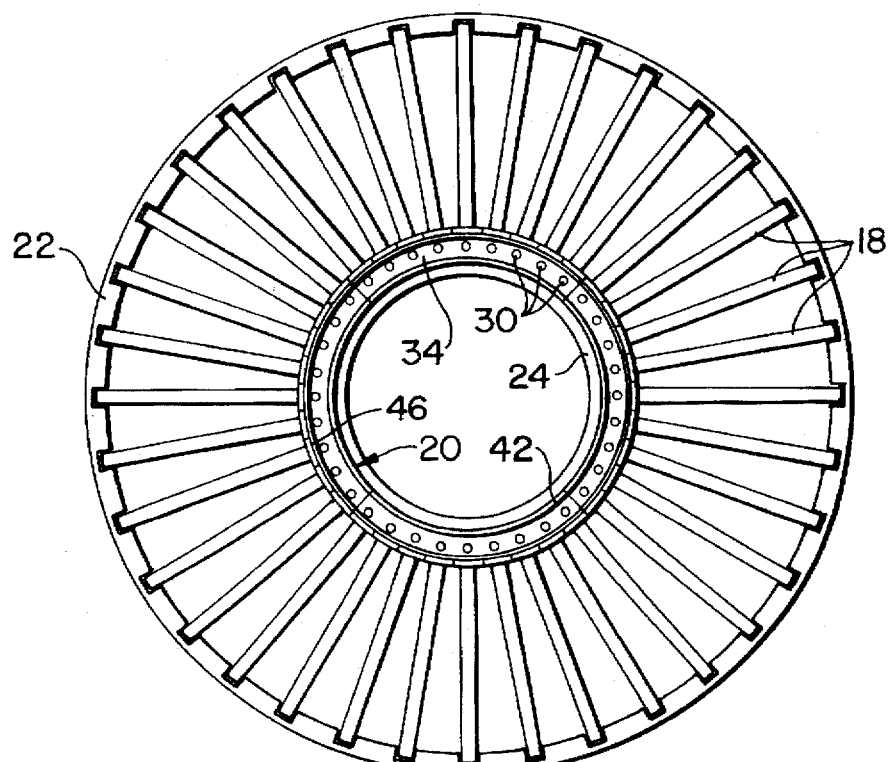
FIG. 4 is a schematic view illustrating the segments of the stator assembly.

FIG. 2 is a sectional view of a portion of the stator assembly and FIG. 2A is a schematic view illustrating the vibrational effects on a prior art assembly. As is apparent from these Figs. the cyclic axial motion imparted to the stator inner diaphragm depicted by arrow B causes the vanes to unwrap some of their aerodynamic twists which, in turn, causes rotation to the moving inner diaphragm 26. (The same reference numerals identifying identical elements are used throughout all the Figs.) Also noted is that the resulting modal motion is cyclic axial displacement of the vane inner diameter relative to the fixed outer diameter (FIG. 2) and rotational oscillation of the inner diameter vane containment ring and diaphragm relative to the fixed outer shroud (FIG. 2A).

As mentioned earlier in the description, the friction damping removes energy generated by the vibrations encountered. The spring damper 32 spring loads the base or inner shroud 28 of stator vanes 18 and the inner diameter containment ring 24 at the contact points or working surfaces 46 and 48. As the stator inner diaphragm 26 moves fore and aft (as noted in FIG. 2) the spring damper at the contact points 46 and 48 rubs relative to the inner shroud 28 and inner diameter containment ring 24. The level of damping is dependant on the relative motion between the damper's fixity point defined by the point of attachment by rivet 30 and the contact points 46 and 48.

There is similar relative motion for the rotational component as the fixity point has different tangential motion than that of the contact points. It will be appreciated that the product of the relative motion and the friction force opposing motion is a measure of the energy removed from the assembly. This will dictate the size and spring rate of spring damper 32.

The spring damper 32 may be fabricated in a split ring configuration or it may be formed in segments. If formed in segments, each segment would preferably span each of the segments of the stator. In this instance, the stator is formed from four (4) equally spaced segments and if four (4) spring dampers are to be utilized, each segment of the spring damper would complement the segment of the stator.

What has been shown by this invention is a damping system that is tailored to the specific modal characteristics of the stator assembly rather than to the airfoil alone or the shroud alone as has been the situation in heretofore known designs.

Although this invention has been shown and described with respect to detailed embodiments thereof, it will be appreciated and understood by those skilled in the art that various changes in form and detail thereof may be made without departing from the spirit and scope of the claimed invention.

I claim:

1. In combination a gas turbine engine having an axial flow compressor section and at least one stator assembly in said compressor section, said stator assembly including a plurality of circumferentially spaced vanes, an outer shroud surrounding said vanes having a slot for defining a restraint for the outer diameter of each of said plurality of circumferentially spaced vanes, an inner shroud surrounding the inner diameter of said vanes and concentrically disposed relative to said outer should for defining an annular passageway between said outer shroud and said inner shroud for fluid to flow therein and aerodynamically load said vanes, said aerodynamic load causing said inner shroud to twist relative to said outer shroud imparting forces in said inner shroud to untwist causing oscillations and an axial motion subjecting said stator assembly to vibrations exhibiting clocking modes, a diaphragm extending radially inwardly from the inner diameter of said vanes, an annular containment ring attached to said diaphragm for supporting said vanes, said annular containment ring having a portion extending angularly relative to the radial position of said diaphragm, means for damping clocking motion and axial movement vibrations encountered by said vane assembly comprising a spring damper element having an arcuate shape and including a pair of working arms defining a pair of working surfaces, said spring damper element being attached to said diaphragm and defining a fixidity point, one of said pair of working surfaces being in tangential sliding relationship with said annular containment ring at said angularly extending portion and the other of said pair of working surfaces being in tangential sliding relationship with the inner diameter of said vanes, wherein the fixity point has different tangential motion than tangential motion of the contact points defined by the sliding relationships so that the clocking mode and said axial movement vibrations of said stator assembly is dampened.

2. The combination as claimed in claim 1 wherein said spring damper element is a split ring.

3. The combination as claimed in claim 1 wherein said spring damper element comprises a plurality of arcuate segments defining an annular ring.

4. The combination as claimed in claim 3 wherein said annular ring comprises four segments.

5. The combination as claimed in claim 4 wherein the ends of said working arms each include a curled end adjacent the respective working surfaces of each respective working arm.

6. The combination as claimed in claim 1 wherein said spring damper element is generally U-shaped in cross section and includes a generally flat shaped apex, and means at the apex for attaching said spring damper element to said diaphragm.

7. The combination as claimed in claim 6 wherein said means for attaching said spring damper element attaches said diaphragm to said containment ring.

8. The combination as claimed in claim 7 wherein said means for attaching said spring damper element is a rivet.

* * * * *